No. 848,657. PATENTED APR. 2, 1907.
F. A. JOHNSON, F. WEDDEMANN & E. BLANKENBERG.
AUTOMATIC SIGN EXHIBITOR.
APPLICATION FILED MAR. 1, 1906.
3 SHEETS—SHEET 1.
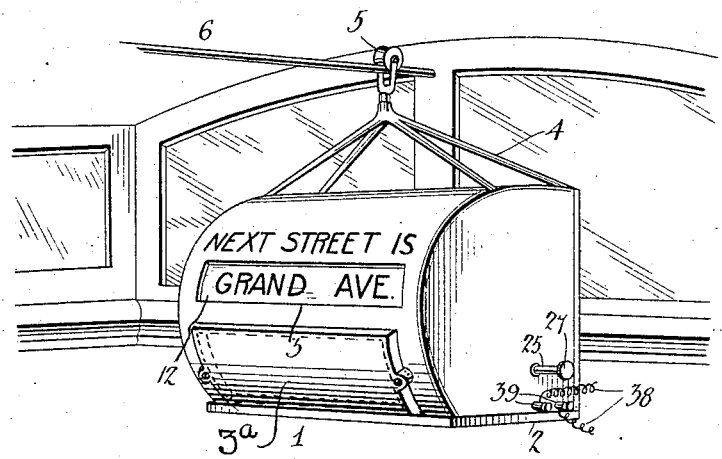
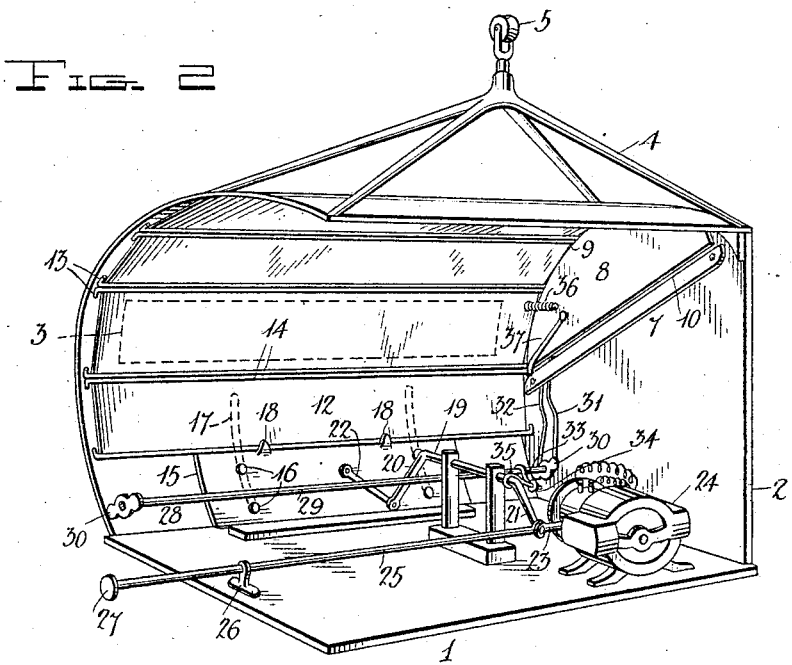

No. 848,657. PATENTED APR. 2, 1907.
F. A. JOHNSON, F. WEDDEMANN & E. BLANKENBERG.
AUTOMATIC SIGN EXHIBITOR.
APPLICATION FILED MAR. 1, 1906.
3 SHEETS—SHEET 2.
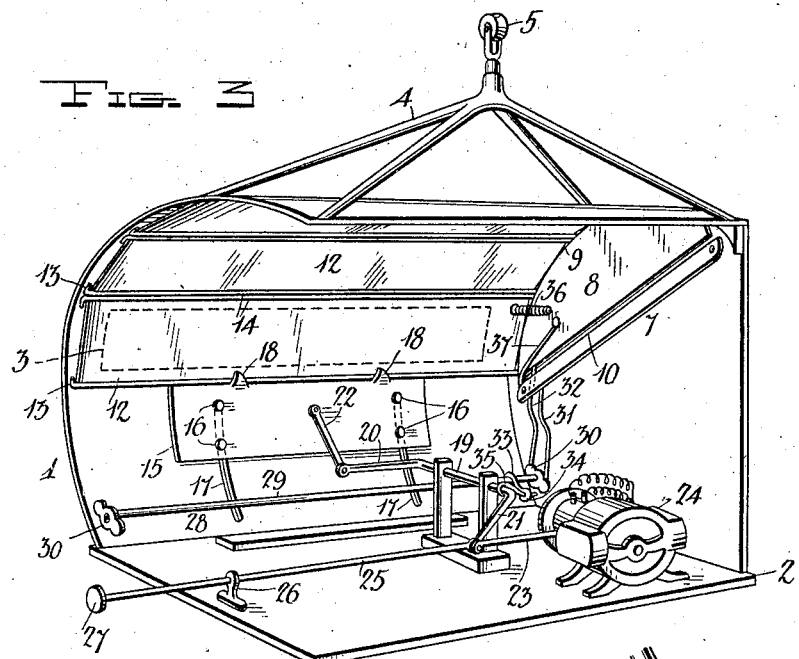
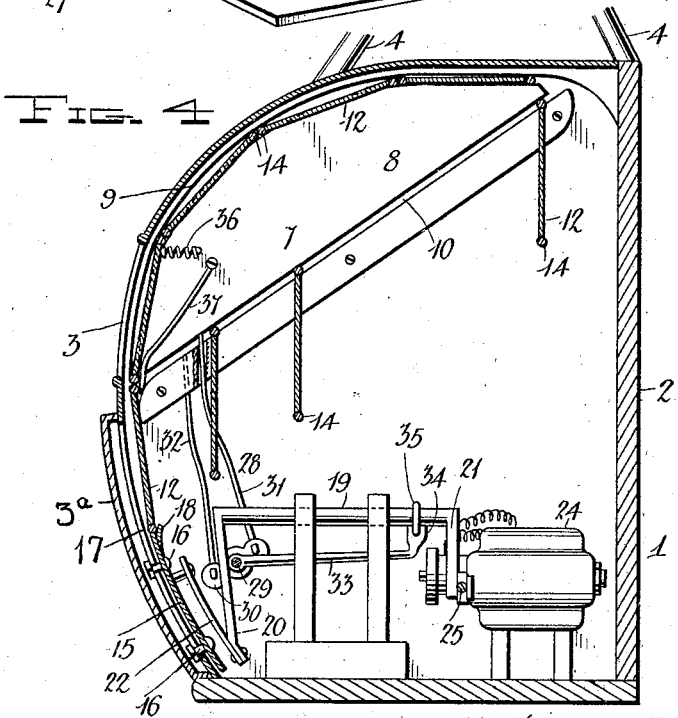
Witnesses
Inventors
Frank A. Johnson,
F. Weddemann and E. Blankenberg
by H. B. Willson &co.
Attorney No. 848,657. PATENTED APR. 2, 1907.
F. A. JOHNSON, F. WEDDEMANN & E. BLANKENBERG.
AUTOMATIC SIGN EXHIBITOR.
APPLICATION FILED MAR. 1, 1906.
3 SHEETS—SHEET 3.
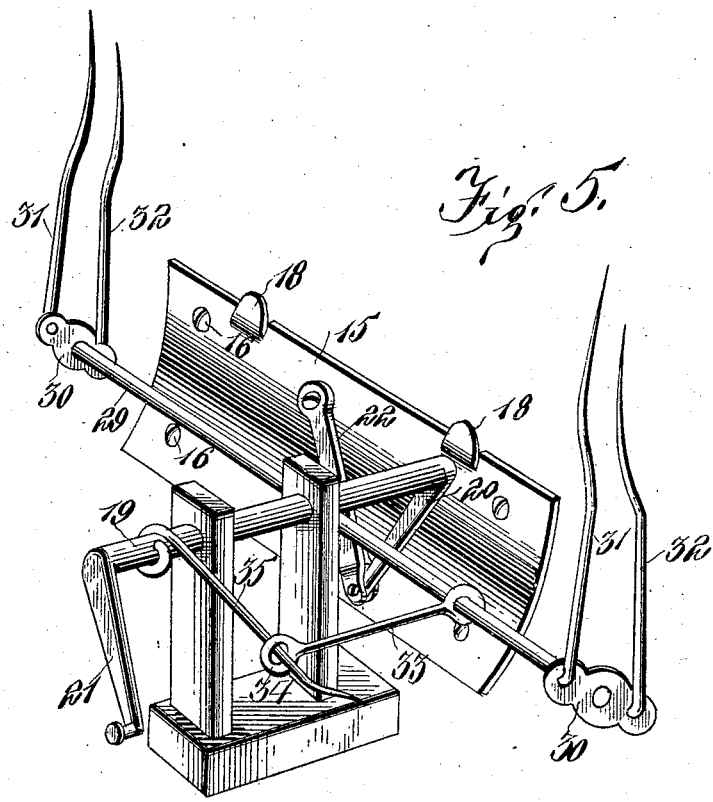
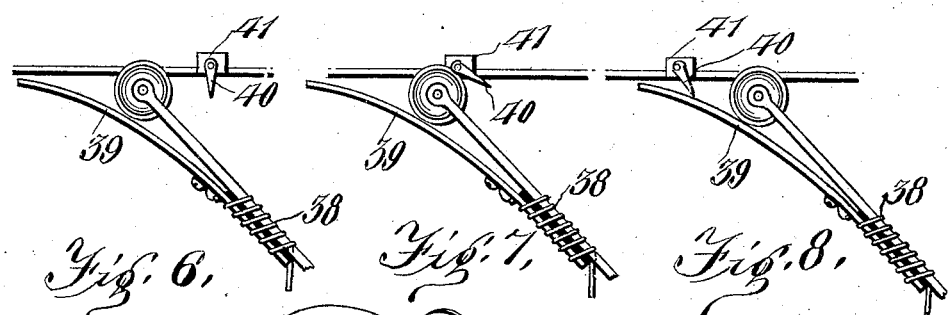
Witnesses
Forrest G. Smith
Jas A. Koebl
Inventors
Frank A. Johnson,
& Fred Weddemann
& E. Blankenberg
by H. B. Wilson & Co.
Attorneys

UNITED STATES PATENT OFFICE.

FRANK A. JOHNSON, FREDERICK WEDDEMANN, AND EDWARD BLANKENBERG, OF DANVILLE, ILLINOIS.

AUTOMATIC SIGN-EXHIBITOR.

No. 848,657.  Specification of Letters Patent.  Patented April 2, 1907.

Application filed March 1, 1906. Serial No. 303,718.

*To all whom it may concern:*

Be it known that we, FRANK A. JOHNSON, FREDERICK WEDDEMANN, and EDWARD BLANKENBERG, citizens of the United States, residing at Danville, in the county of Vermilion and State of Illinois, have invented certain new and useful Improvements in Automatic Sign-Exhibitors; and we do declare the following to be a full, clear, and exact description of the invention, such as will enable others skilled in the art to which it appertains to make and use the same.

This invention relates to improvements in automatic sign-exhibitors.

The object of the invention is to provide a device of this character in which a number of signs may be automatically displayed in succession and which will be particularly adapted for use in street-cars for displaying signs containing the names of the streets across which the cars pass, means being provided whereby the mechanism of the exhibitor will be operated to cause the proper signs to be displayed as the cars approach the street having the name indicated on such sign.

With the above and other objects in view the invention consists of certain novel features of construction, combination, and arrangement of parts, as will be hereinafter described and claimed.

In the accompanying drawings, Figure 1 is a perspective view of a portion of the inside of a trolley-car, showing the arrangement and position of the exhibitor therein. Fig. 2 is an inside perspective view of the exhibitor, parts of the casing being removed to disclose the operative mechanism therein. Fig. 3 is a similar view illustrating the operation of the device. Fig. 4 is a vertical sectional view through the exhibitor, the operative mechanism being in the position shown in Fig. 2 of the drawings. Fig. 5 is an enlarged detail perspective view of the operating mechanism removed from the casing. Figs. 6, 7, and 8 are detail views of a portion of the trolley-pole and the trolley-wire, showing the manner in which a current of electricity is taken from said wire and conducted to the electric motor within the casing of the exhibitor; and Fig. 9 is a detail perspective view of the upper end of the trolley-pole, showing the arrangement of the contact-plate thereon.

Referring more particularly to the drawings, 1 denotes the exhibitor, which consists of a hollow box or casing 2, having formed in its outer curved side a display-opening 3, below which is arranged a panel or plate 3ª to receive advertising or other printed matter. The casing 1 is adapted to be supported within the car in any suitable position and in any desired manner, the same being here shown as provided with upwardly-converging supporting-frames 4, to which is swiveled a hanger-roller 5, said hanger-roller being adapted to be engaged with a longitudinally-disposed bar 6, arranged in the upper portion of the car, as shown.

Within the casing 2 and secured to the opposite ends of the same are arranged supporting-racks 7, consisting of segmental plates 8, between which and the covered front face of the casing 2 is formed a guide passage or channel 9. Adjacent to and running parallel with the straight edge of the plate 8 is an inclined passage or channel 10. Adapted to slide in the passages 9 and 10 and to be supported by the plates 8 are a series of sign-plates 12, which are here shown as containing the names of the streets crossed by the car. The plates 12 are provided at each end with inwardly-curved lugs 13, said lugs being preferably formed from a continuation of rods 14, secured to and forming a binding for the longer edges of the sign-plates. These inwardly-curved lugs 13 enter the guide passages or channels and engage the edges of the plates 8, which latter are spaced from the end walls of the casing.

The mechanism for shifting or moving the sign-plates opposite the view-opening 3 of the casing consists of a plunger-plate 15, which is slidably connected to the inner side of the curved front face of the casing by means of bolts or rivets 16, which are passed through the plunger-plates 15 and through slots 17, formed in the front face of the casing, as shown. The upper ends of the plunger-plates 15 are provided with upwardly-projecting retaining-lugs 18, which hold the lower edge of the sign-plates in position upon said plunger-plate, as shown.

The mechanism for operating the plunger-plate 15 consists of a horizontally-disposed shaft 19, which is journaled in suitable bearings in the casing 2. On one end of the shaft 19 is formed a crank-arm 20, and on the opposite end of the same is formed a crank-arm 21, said crank-arms projecting in different directions from the vertical plane of the shaft to such an extent as to properly operate the parts. Pivotally connected to the end of the crank-arm 20 is a pitman rod or link 22, the opposite end of which is pivotally connected to the plunger-plate 15, as shown. The crank-arm 21 at the opposite end of the shaft 19 is pivotally connected at its outer end to a connecting-rod 23, the opposite end of which is attached to a crank-arm on the shaft of an electric motor 24, arranged within the casing of the exhibitor, as shown, whereby when said motor is energized the shaft 19 will be rocked, thereby raising and lowering the plunger-plate to move the sign-plates opposite the view-opening of the casing. In order that the shaft 13 and the parts controlled thereby may be manually operated, a push-rod 25 is provided, said rod being pivotally connected at its inner end to the crank-arm 21 and slidably mounted in a guide-bracket 26 and provided on its outer end with a head 27.

In the arrangement of the device, as shown in the drawings, the sign-plates are adapted to slide upwardly in the passages 9 to the rear upper end of the plates 8, at which point they will pass around the edges of the plates 8, the outer ends of the same dropping downwardly as shown in Fig. 4. The sign-plates when in this position are supported by the curved lugs 13 on the upper edges of the same, which engage the obliquely-disposed channels or passages 10, down which they slide by gravity until caught by the upper end of an escapement device 28. This escapement device 28 consists of a longitudinally-disposed rock-shaft 29, which is journaled in the casing 2 and has connected to its opposite ends cross heads or plates 30, to which are connected upwardly-projecting curved stop fingers or arms 31 and 32, the upper ends of which are adapted to intersect the inclined passages 10, thereby holding the sign-plates back in the slots in the channels or passages 10, as shown. Connected to the shaft 29 is a horizontally-disposed arm 33, the free end of which is provided with an eye 34, adapted to be engaged by the curved outer end of the push-rod 35, the opposite end of which is fixedly mounted upon the crank-shaft 19, whereby when said shaft is operated the shaft 29 will be rocked in one direction or the other, which will cause the ends of the fingers 31 and 32 to be alternately projected upwardly across the passages 10. The movement of the arms or fingers 31 and 32 will permit the passage of one sign-plate between the same simultaneously with the discharge of the plate previously caught between the same, thus permitting the passage of but one plate at a time from the channels or passages 10.

The sign-plate after leaving the passages 10 drops upon the upper edge of the plunger-plate 15, where it is held in place by the lugs 18 and by which the same is moved upwardly across the view-opening of the casing. The sign-plate previously moved opposite said opening is shoved up by the lower plate into the channels or passages 9, from the opposite end of which said plates are discharged, as hereinbefore described. In order that the sign-plates may be held in yielding engagement with the sides of the casing opposite the view-opening therein, spring-plungers 36 are provided, between which and the adjacent outer wall of the casing is supported the sign-plates while the same are opposite the view-opening of said casing. In order to prevent the lugs on the upper corners of the sign-plates from reëntering the passages 10 while the former are being moved upwardly by the plunger-plate, we provide stop-arms 37, which are pivotally mounted on the segmental plates 8 and are adapted to lie at such an angle as to permit the lugs on the sign-plates to pass out of the passages 10, but which will prevent the reëntrance of the same therein while the same are being moved upwardly by the plunger-plate.

The motor 24 may be of any suitable type; but is here shown and is preferably an electric motor. The motor is supplied with electricity in any suitable manner, the same being here shown as supplied by conductor-wires 38, connected to binding-posts 39 on one end of the casing, and from whence the current is taken into the casing and applied to the motor. One of the wires 38 has a ground connection, and the other is wound upon the trolley-pole near the upper end of the same and electrically connected to a yielding contact-plate 39, secured to but insulated from said trolley-pole. This contact-plate 39 is adapted to engage depending contact-pieces 40, which are pivotally connected to blocks 41, secured to the trolley-wire at the approach of each street-crossing, so that a current of electricity will be taken from said trolley-wire at the proper time to energize and start the motor, which will actuate the operating mechanism and cause the same to shift the proper sign-plate opposite the view-opening, as hereinbefore described.

The operation of the device is as follows: When the crank-shaft 19 is oscillated, either by manually operating the push-rod 27 or by the passage of an electric current through the motor 24, as above explained, the crank-arm 20 and pitman 22 will move the plunger-plate 15 upwardly, thereby elevating the sign-plate resting upon it and the series of sign-plates in the upper passage-ways 9. When the lowermost sign-plate is thus elevated to a position opposite the sight-opening 3 in said casing, it is retained in such position by the spring devices 36, and the uppermost sign-plate in the passages or guideways 9 upon reaching the rear ends of the latter will drop so that the lugs 13 upon its rear edge will pass over the upper ends of the passages or guideways 10 and the lugs 13 on the forward edge of the same will drop into the upper ends of the guideways 10 and slide down the latter by gravity. In so doing the sign-plate will be reversed—that is, the face of the sign-plate which was turned outwardly will be turned inwardly when it passes above the sight-opening 3 the succeeding time. It will be understood that the matter to be displayed through the sight-opening 3 is placed upon both sides of the sign-plates, and when the device is used as a street or station indicator the names of the streets are properly placed upon both sides or faces of the sign-plates. When the crank-shaft 19 is oscillated, as previously stated, its crank or arm 35 will move the crank-arm 33, and thereby rock the shaft 29, so that the fingers 31 32 will be operated to permit the lowermost sign-plate in the passages or guideways 10 to drop upon the plunger-plate 15 when the latter drops to its lowered position.

Various changes in the form, proportion, and the minor details of construction within the scope of the appended claims may be resorted to without departing from the principle or sacrificing any of the advantages of this invention.

Having thus described our invention, what we claim as new, and desire to secure by Letters Patent, is—

1. In a sign-exhibitor of the character described, the combination with a casing having a view-opening, of supporting-plates arranged on the ends of said casing to form upper and lower guide-passages, slidably-supported sign-plates, angularly-bent lugs formed on said plates to engage said guide-passages, a plunger-plate adapted to raise said sign-plates upwardly in said upper guide-passages thereby successively bringing said plates opposite said view-opening at one end of said upper passages and engaging the sign-plate at the opposite end of the upper passages with the upper end of the lower inclined passages, to the lower ends of which the plates drop by gravity, means whereby one sign-plate at a time is released and permitted to drop from said lower passages onto said plunger-plate, and means whereby said plunger-plate is automatically operated to raise the plates that have dropped thereon, substantially as described.

2. In a sign-exhibitor of the character described, the combination with a casing having a view-opening, of supporting-plates secured to the ends of said casing, said plates being arranged to form upper and lower guide-passages, sign-plates slidably supported by said plates, means whereby said plates are slidably engaged with the guide-passages, a plunger-plate adapted to successively raise said sign-plates opposite to said view-opening, means to hold said sign-plates opposite said view-opening until pushed upwardly by the next plate, a crank-shaft journaled in said casing, oppositely-projecting crank-arms arranged on said shaft, a pitman-rod to connect one of said arms with said plunger-plate, a motor arranged in said casing, and a pitman-rod connecting said motor with the crank-arm on the opposite end of said crank-shaft, substantially as described.

3. In a sign-exhibitor of the character described, the combination with a casing having a view-opening, of supporting-plates secured to the ends of said casing, said plates being arranged to form upper and lower guide-passages, sign-plates slidably supported by said plates, means whereby said sign-plates are slidably engaged with the guide-passages, a plunger-plate adapted to successively raise said sign-plates opposite said view-opening, means for holding said sign-plates opposite said view-opening until pushed upwardly by the next plate, a crank-shaft journaled in said casing, crank-arms upon said shaft, a pitman-rod connecting one of said crank-arms to said plunger-plate, an electric motor arranged in said casing, and a rod connecting said motor and another crank-arm on said crank-shaft.

4. In a sign-exhibitor of the character described, the combination with a casing having a view-opening, of supporting-plates secured to the ends of said casing, said plates being arranged to form upper and lower guide-passages, sign-plates slidably supported by said plates, means whereby said sign-plates are slidably engaged with the guide-passages, a plunger-plate adapted to successively raise said sign-plates opposite said view-opening, means for holding said sign-plates opposite said view-opening until pushed upwardly by the next plate, a crank-shaft journaled in said casing, crank-arms upon said shaft, a pitman-rod connecting one of said crank-arms to said plunger-plate, and an intermittently-operated electric motor arranged in said casing and connected to another crank-arm upon said shaft.

5. In a device of the character described, a casing having a sight-opening, downwardly-inclined feed-guideways, return-guideways leading past said opening and to the upper ends of said feed-guideways, sign-plates slidably engaged with said guideways, a plunger for successively raising said sign-plates opposite said opening and moving them through said return-guideways, means for holding said sign-plates opposite said opening, an escapement device for successively feeding the sign-plates in said feed-guideways onto said plunger, means for operating said plunger, and means for reversing the sign-plates on their return movement.

6. In a device of the character described, a casing having a sight-opening, downwardly-inclined feed-guideways, return-guideways leading past said opening and to the upper ends of said feed-guideways, sign-plates slidably engaged with said guideways, a plunger for successively raising said sign-plates opposite said opening and moving them through said return-guideways, means for reversing the sign-plates on their return movement, means for holding said sign-plates opposite said opening, pairs of oppositely-moving escapement-fingers for feeding the sign-plates in said feed-guideways onto said plunger, and means for simultaneously operating said plunger and said escapement-fingers.

7. In a device of the character described, a casing having a sight-opening, downwardly-inclined feed-guideways, return-guideways leading past said opening and to the upper ends of said feed-guideways, sign-plates slidably engaged with said guideways, a plunger for successively raising said sign-plates opposite said opening and moving them through said return-guideways, means for holding said sign-plates opposite said opening, a rock-shaft, cross-bars thereon, escapement-fingers upon said cross-bars for feeding the sign-plates in said feed-guideways onto said plunger, an operating-shaft, connections between the latter and said plunger for operating said plunger, and connections between said operating-shaft and said rock-shaft for actuating said escapement-fingers.

8. In a device of the character described, a casing having a sight-opening, downwardly-inclined feed-guideways, return-guideways leading past said opening and to the upper ends of said feed-guideways, sign-plates slidably engaged with said guideways, a plunger for successively raising said sign-plates opposite said opening and moving them through said return-guideways, means for holding said sign-plates opposite said opening, means whereby one sign-plate at a time is released from said feed-guideway and permitted to drop upon said plunger, a crank-shaft, and a rod connecting the crank upon said shaft to said plunger-plate.

9. In a device of the character described, a casing having a sight-opening, supporting-plates upon and spaced from the opposite walls of said casing to provide downwardly-inclined feed-guideways and return-guideways leading past said sight-opening and to the upper ends of said feed-guideways, sign-plates having angularly-bent lugs to enter and slide in said guideways, a plunger for successively raising said sign-plates opposite said opening and moving them through said return-guideways, means for feeding said sign-plates from said feed-guideways onto said plunger, means for operating said plunger, and means for reversing the sign-plates on their return movement.

In testimony whereof we have hereunto set our hands in presence of two subscribing witnesses.

FRANK A. JOHNSON.
FR. WEDDEMANN.
ED. BLANKENBERG.

Witnesses:
M. SALMANS,
FRED DRAPER.